United States Patent
Heckel et al.

(10) Patent No.: US 6,994,076 B2
(45) Date of Patent: Feb. 7, 2006

(54) ELECTROSTATIC DROPLET COLLECTOR WITH REPLACEABLE ELECTRODE

(75) Inventors: Scott P. Heckel, Stoughton, WI (US); Gregory W. Hoverson, Cookeville, TN (US); Mark J. Johnson, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/820,541

(22) Filed: Apr. 8, 2004

(65) Prior Publication Data

US 2005/0224022 A1   Oct. 13, 2005

(51) Int. Cl.
*F02M 31/18*   (2006.01)
(52) U.S. Cl. ...................................... 123/536
(58) Field of Classification Search ................ 123/536, 123/538, 539, 537; 55/385.3; 60/275
See application file for complete search history.

(56) References Cited

U.S. PATENT DOCUMENTS

| | | | |
|---|---|---|---|
| 1,605,648 A | 11/1926 | Cooke | |
| 2,085,349 A | 6/1937 | Wintermute | |
| 3,668,835 A | 6/1972 | Vicard | |
| 3,755,991 A | 9/1973 | Steuernagel | |
| 3,761,062 A * | 9/1973 | King ............................ | 261/1 |
| 3,910,779 A | 10/1975 | Penney | |
| 3,980,053 A * | 9/1976 | Horvath ........................ | 123/3 |
| 3,999,964 A | 12/1976 | Carr | |
| 4,023,545 A * | 5/1977 | Mosher et al. ................. | 123/3 |
| 4,202,674 A | 5/1980 | Rodenberger et al. | |
| 4,222,748 A | 9/1980 | Argo et al. | |
| 4,239,514 A | 12/1980 | Junkers | |
| 4,381,927 A | 5/1983 | Noll | |
| 4,478,613 A | 10/1984 | Brettschneider et al. | |
| 5,243,950 A * | 9/1993 | Dalupan ..................... | 123/573 |
| 5,911,213 A | 6/1999 | Ahlborn et al. | |
| 5,934,261 A | 8/1999 | Schumann et al. | |
| 6,221,136 B1 | 4/2001 | Liu et al. | |
| 6,348,103 B1 | 2/2002 | Ahlborn et al. | |
| 6,364,941 B2 | 4/2002 | Liu et al. | |
| 6,527,821 B2 | 3/2003 | Liu et al. | |
| 6,770,105 B2 * | 8/2004 | Berlin et al. .................. | 44/321 |
| 6,817,347 B2 * | 11/2004 | Noble ......................... | 123/536 |
| 6,851,413 B1 * | 2/2005 | Tamol, Sr. .................. | 123/536 |

FOREIGN PATENT DOCUMENTS

WO            00/30755          6/2000

* cited by examiner

*Primary Examiner*—Henry C. Yuen
*Assistant Examiner*—Jason Benton
(74) *Attorney, Agent, or Firm*—Andrus, Sceales, Starke & Sawall, LLP (57) ABSTRACT

In an internal combustion engine electrostatic crankcase ventilation system, an EDC, electrostatic droplet collector, assembly includes a replaceable electrode assembly.

28 Claims, 9 Drawing Sheets

ELECTROSTATIC DROPLET COLLECTOR WITH REPLACEABLE ELECTRODE

BACKGROUND AND SUMMARY

The invention relates to internal combustion engine electrostatic crankcase ventilation systems, including for diesel engines, and more particularly to the EDC, electrostatic droplet collector, in such system.

Electrostatic collectors or precipitators, including for diesel engine electrostatic crankcase ventilation systems, are known in the prior art. In its simplest form, a high voltage corona discharge electrode is placed in the center of a grounded canister or tube forming an annular ground plane providing a collector electrode around the discharge electrode. A high DC voltage, such as several thousand volts, e.g. 15 kV, on the center discharge electrode causes a corona discharge to develop near the electrode due to high electric field intensity. This creates charge carriers that cause the ionization of the gas in the gap between the high voltage electrode and the ground electrode. As the gas containing suspended particles flows through this region, the particles are electrically charged by the ions. The charged particles are then precipitated electrostatically by the electric field onto the interior surface of the collecting tube or canister.

EDCs have been used in diesel engine crankcase ventilation systems for removing suspended particulate matter including oil droplets from the blowby gas, for example so that the blowby gas can be returned to the atmosphere, or to the fresh air intake side of the diesel engine for further combustion thus providing a blowby gas recirculation system. EDCs are also used in other internal combustion engine electrostatic crankcase ventilation systems for receiving recirculation gas from the engine, and returning cleaned gas to the engine.

The corona discharge electrode assembly as commonly used in the prior art has a holder or bobbin with a 0.006 inch diameter wire strung in a diagonal direction. The bobbin is provided by a central drum extending along an axis and having a pair of annular flanges axially spaced along the drum and extending radially outwardly therefrom. The wire is a continuous member strung back and forth between the annular flanges to provide a plurality of segments supported by and extending between the annular flanges and strung axially and partially spirally diagonally between the flanges.

When the EDC is in service on a diesel engine, a build-up of sludge often occurs on the grounded electrode, i.e. the annular ground plane provided by the canister. This sludge build-up can cause a degradation of the performance of the EDC, and increases frequency of arcing. Prior solutions to this problem have focused on cleaning the assembly.

The present invention provides an EDC with a replaceable electrode assembly which is connectable and removable in a simple servicing step enabling and facilitating replacement at regular service intervals. In preferred form, part of the EDC is permanent and remains attached to the engine or an underhood mounting location, and only low cost items are replaced. The ease of servicing promotes periodic replacement, thus avoiding the noted degradation of performance. In further preferred form, the electrode assembly is replaced in a simple spin-on, spin-off step, comparable to replacing an oil filter. In one embodiment, both the collector electrode and the discharge electrode are removed as a unit from a mounting head in the system. In another embodiment, only the collector electrode is removed.

DETAILED DESCRIPTION

Figure 1:
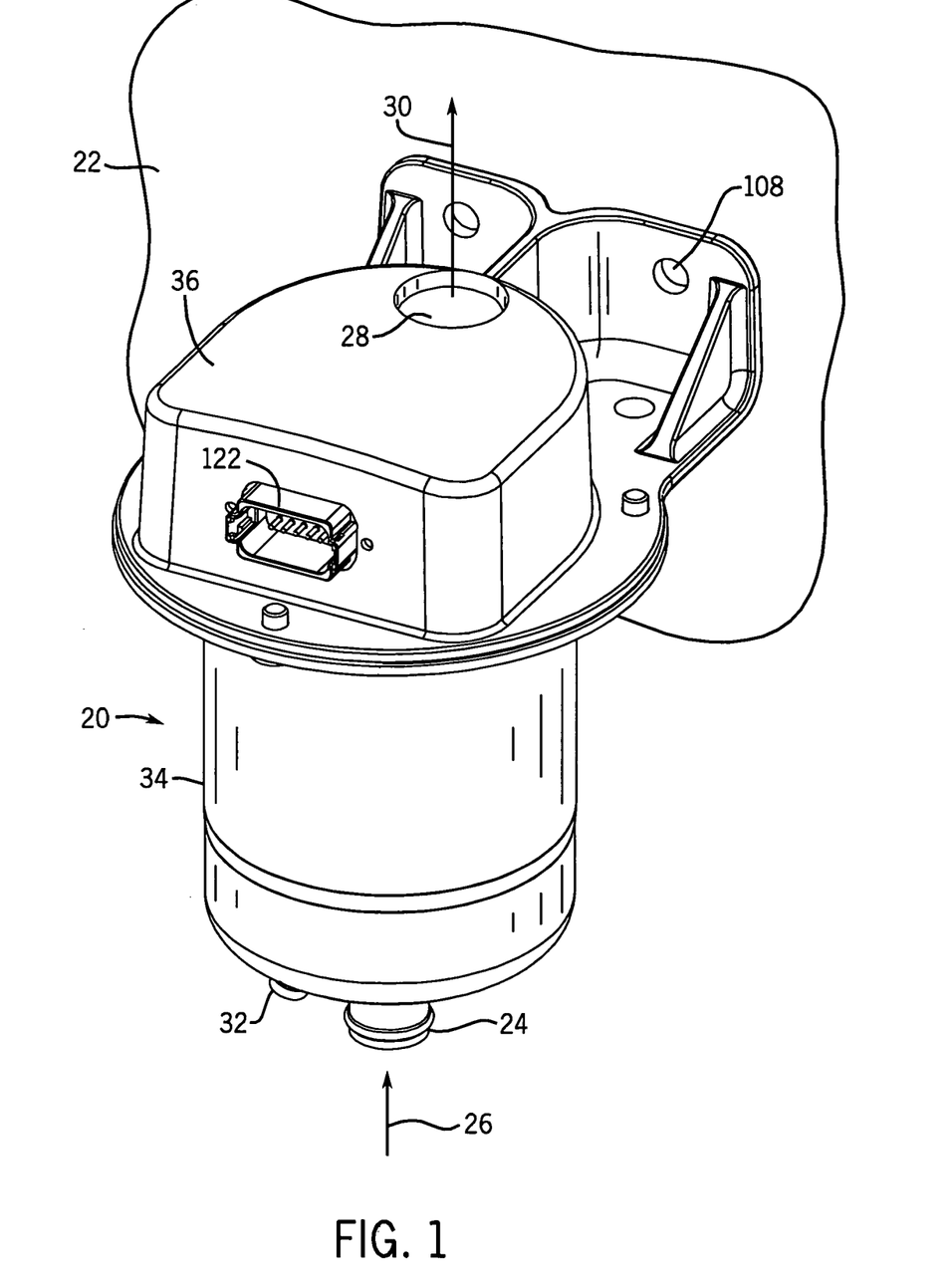
FIG. 1 is a perspective assembly view of an EDC, electrostatic droplet collector, in accordance with the invention.

FIG. 1 shows an EDC, electrostatic droplet collector, assembly 20 for an internal combustion engine 22 having an electrostatic crankcase ventilation system, e.g. receiving recirculation gas from the engine, such as blowby gas from a diesel engine, at inlet 24 as shown at arrow 26, and returning cleaned gas to the atmosphere or to the engine from outlet 28 as shown at arrow 30. Collected particulate is discharged at valved drain port 32, as is known. The assembly includes a cylindrical canister 34 having the noted inlet 24, and a mounting head 36 having the noted outlet 28. A corona discharge electrode assembly 38, FIG. 2, is in the canister and removable therewith as a unit from the mounting head, to be described.

Figure 2:
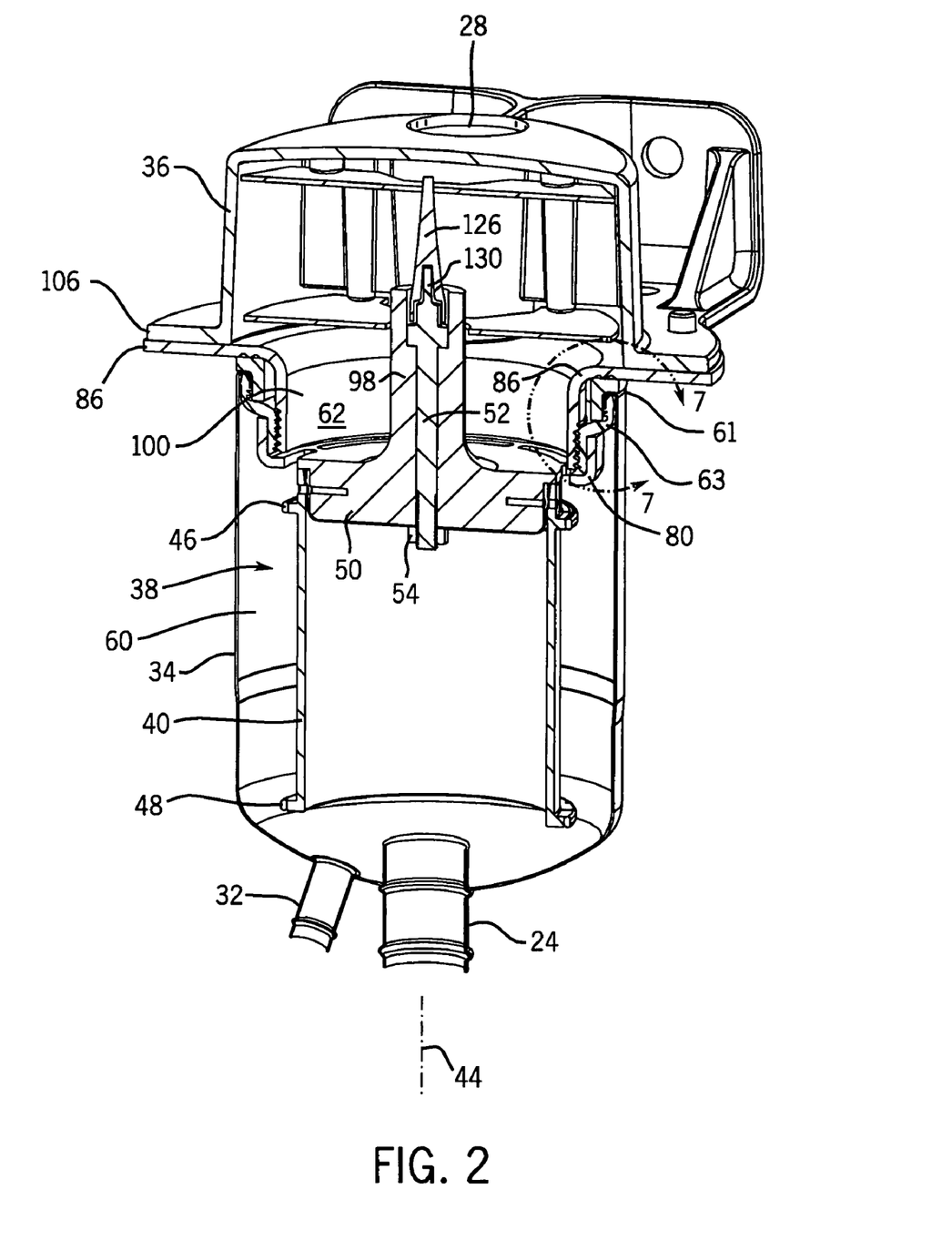
FIG. 2 is a sectional view of the structure of FIG. 1.
Figure 3:
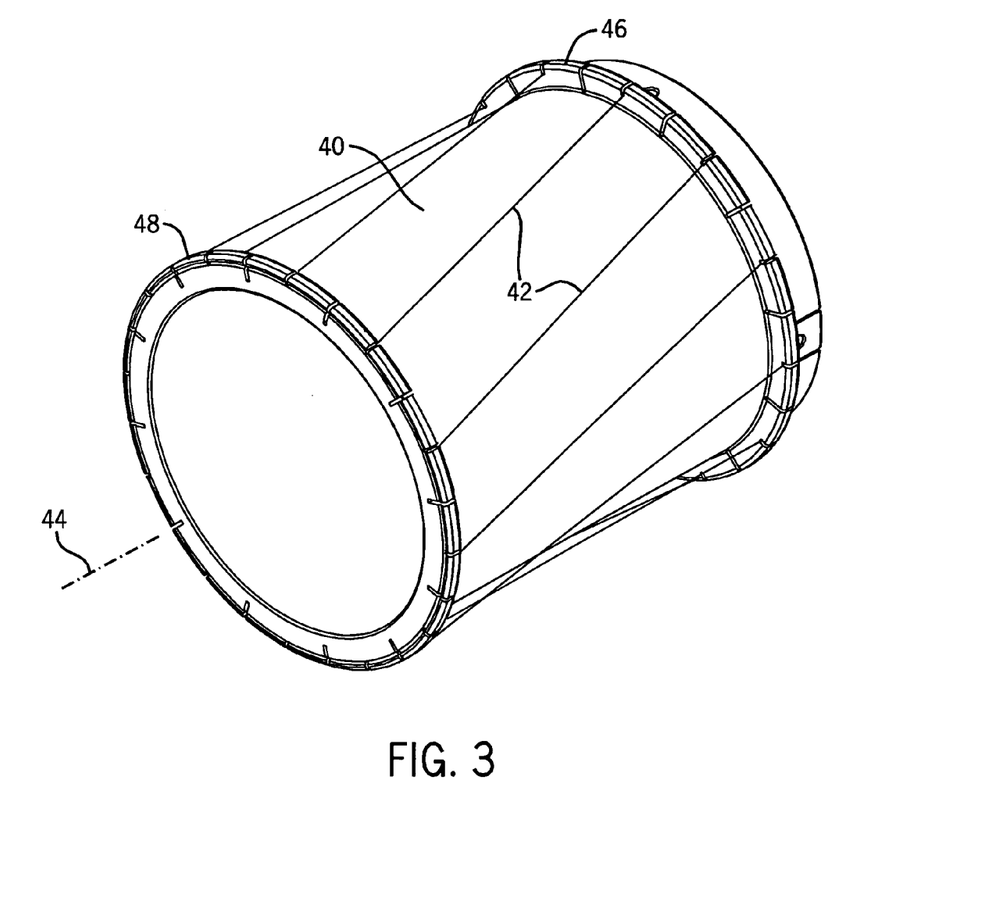
FIG. 3 is a perspective view of a component of FIG. 2.
Figure 4:
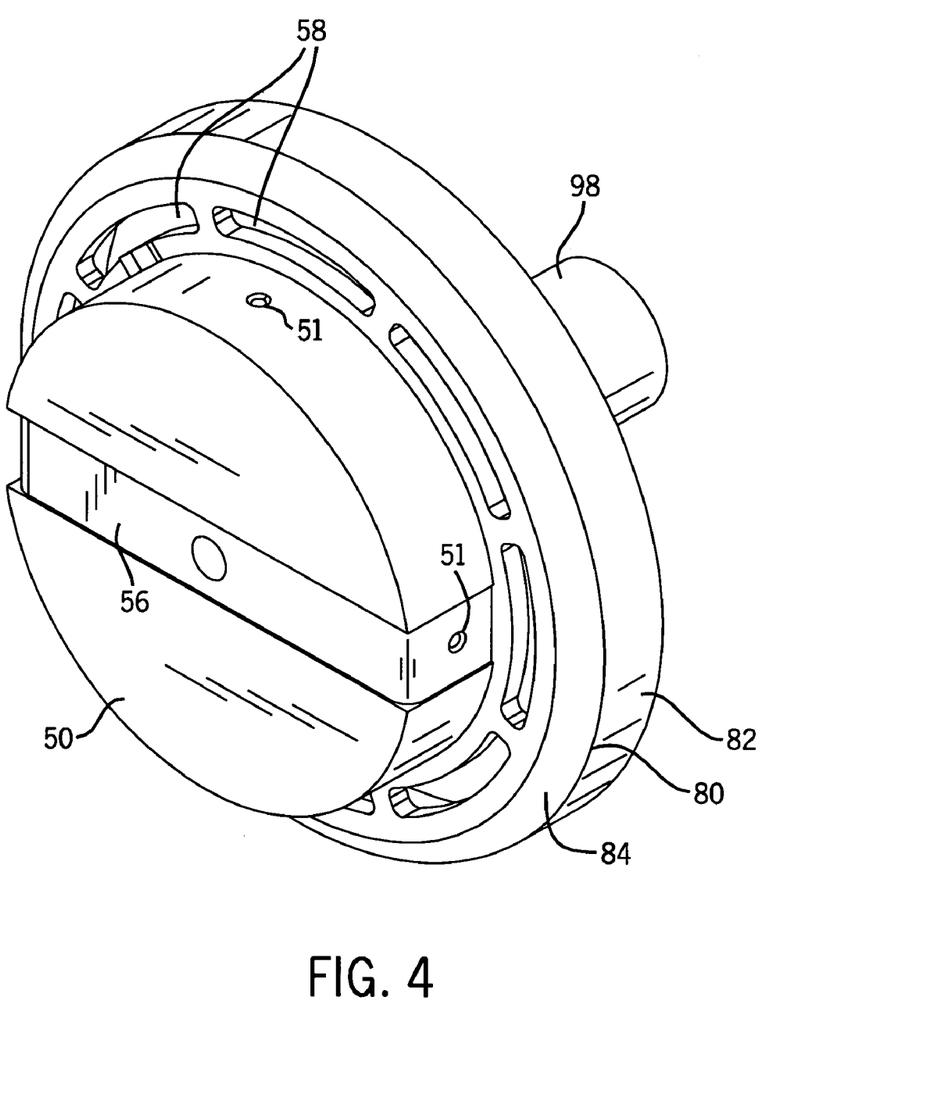
FIG. 4 is a perspective view of another component of FIG. 2.

The corona discharge electrode assembly includes an electrically insulating holder or bobbin 40, FIG. 3, as known in the prior art, with a conductor wire 42 strung in a diagonal direction. The bobbin is provided by a central hollow drum extending axially along an axis 44 and having a pair of annular flanges 46, 48 spaced along the drum and extending radially outwardly therefrom. Wire 42 is a continuous member strung back and forth between the annular flanges to provide a plurality of segments supported by and extending between the annular flanges and strung axially and partially spirally diagonally between the annular flanges. In further embodiments, the corona discharge electrode may be provided as shown in commonly owned co-pending U.S. patent application Ser. No. 10/634,565, filed Aug. 5, 2003 or application Ser. No. 10/824,317, filed on Apr. 8, 2004. Bobbin 40 is attached to an electrically insulating disk 50, FIGS. 2, 4, e.g. by screw holes such as 51. Insulator disk 50 has a high voltage electrode 52 attached thereto by threaded nut 54 to connect electrode 52 to conductor strip 56 to conduct current to wire 42, as is known. Insulator disk 50 has a plurality of exit apertures 58 around its circumference for conducting recirculation gas therethrough from corona discharge zone 60 into plenum 62. The recirculation gas passes from inlet 24 then through corona discharge zone 60 between high voltage corona discharge electrode 42 and the collector electrode provided by the annular ground plane canister 34 then through apertures 58 into plenum 62 then through mounting head 36 to outlet 28 at arrow 30.

Canister 34 extends axially along axis 44 and has an open axial end 61 facing mounting head 36. A mounting plate 63, FIGS. 2, 5, 7, has a first portion 64 attached to canister 34, e.g. by welding or by crimping the end of the canister over portion 64 as shown at 66. Mounting plate 63 is a nut plate having a second portion 68 removably mountable to the mounting head preferably in threaded relation as shown at threads 70. Electrical insulator 50 is attached to mounting nut plate 63, preferably by being permanently bonded thereto. Mounting nut plate 63 has first segment 64 attached to canister 34, which segment 64 is also sealed to the mounting head by an annular gasket 72 therebetween, such as rubber or other elastomeric material. Second segment 68 of mounting nut plate 63 engages the mounting head in threaded relation at 70. Segment 64 of the mounting nut plate is attached to canister 34 at open axial end 61 of canister, and segment 64 and open axial end 61 are sealed to the mounting head by annular gasket 72 therebetween.

Figure 5:
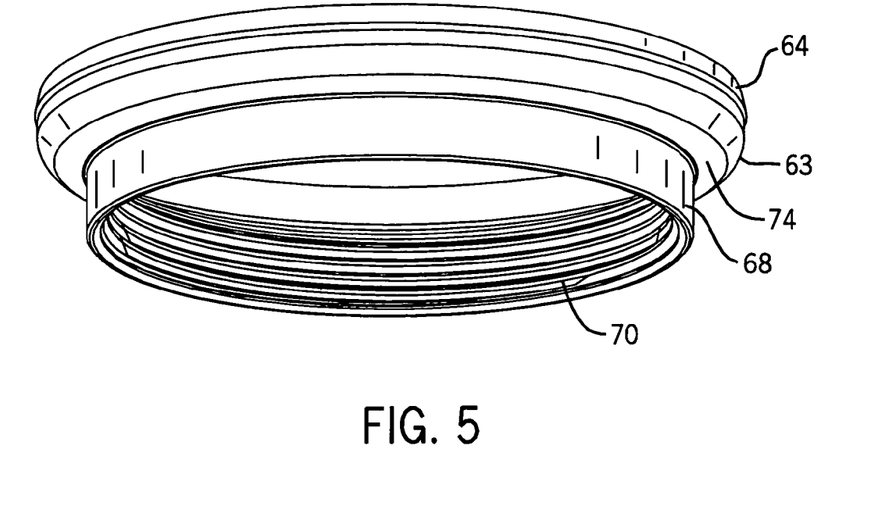
FIG. 5 is a perspective view of another component of FIG. 2.
Figure 7:
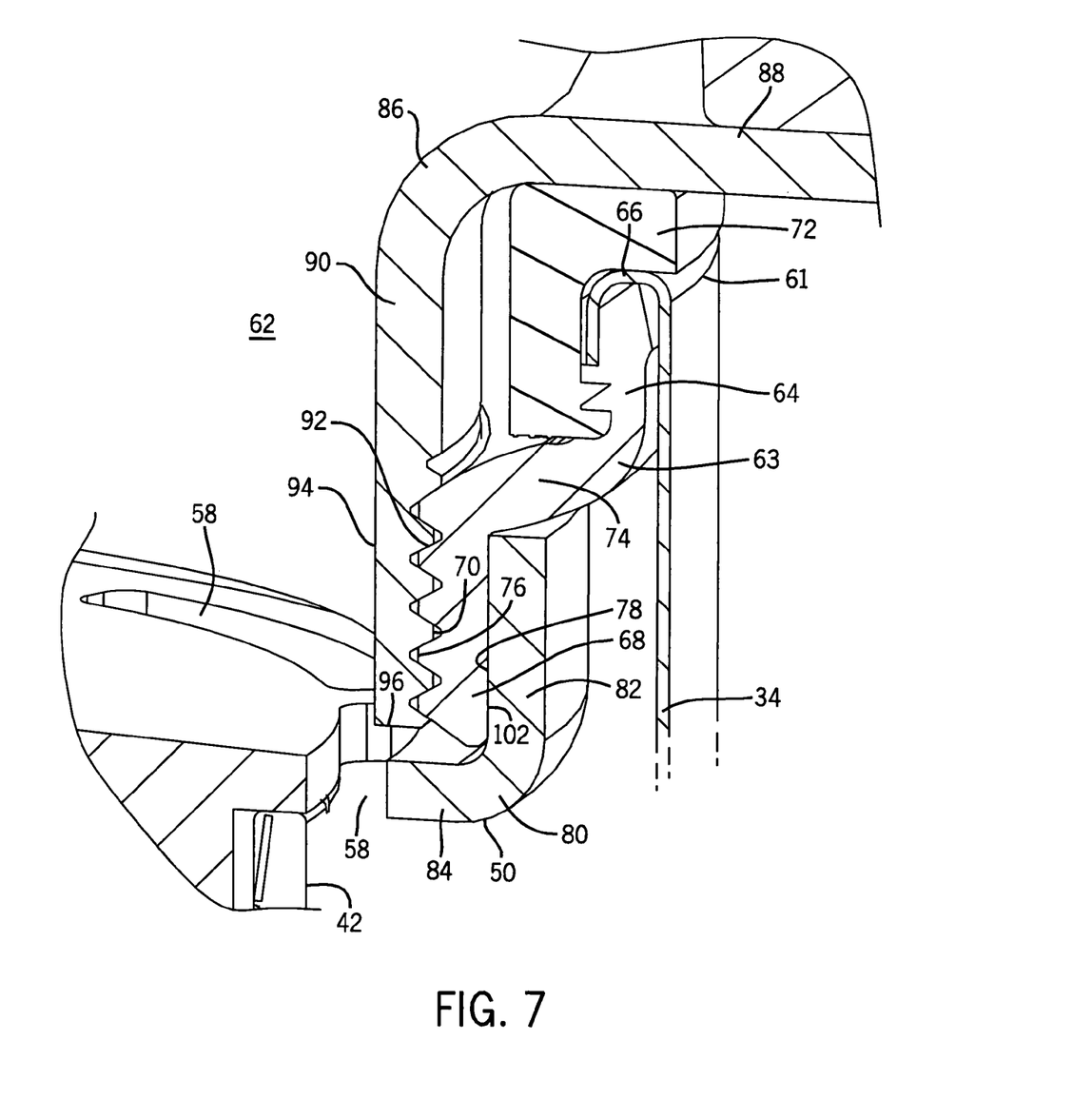
FIG. 7 is an enlarged view of a portion of FIG. 2.
Figure 8:
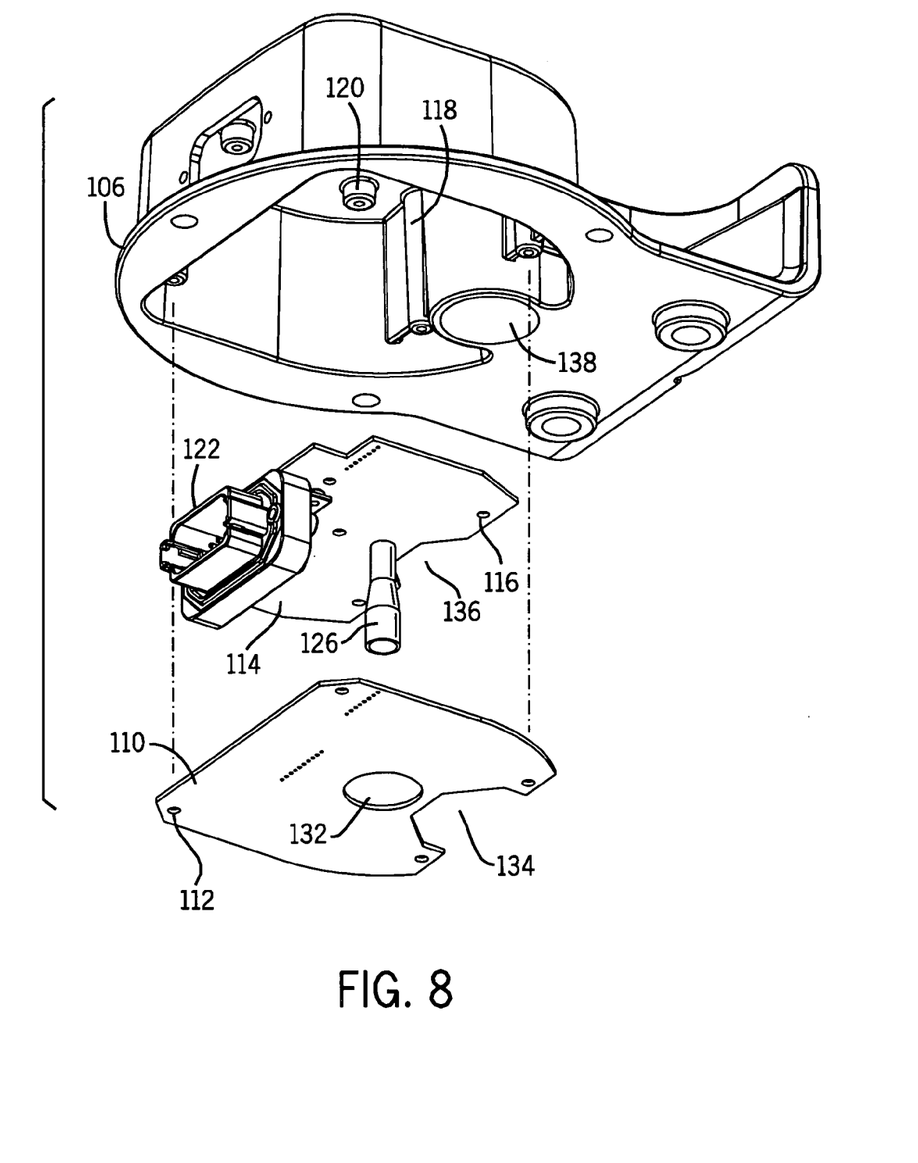
FIG. 8 is an exploded perspective view of a portion of FIG. 1.

Mounting nut plate 63, FIGS. 2, 5, 7, has an intermediate shoulder 74 extending radially inwardly from first segment 64 to second segment 68. Segment 64 extends axially upwardly from shoulder segment 74 and supports gasket 72. Segment 68 extends axially downwardly from shoulder segment 74. Segment 68 has a first face 76 facing radially inwardly and threaded at 70. Segment 68 has a second face 78 facing radially outwardly. Electric insulator 50 has an outer L-shaped flange 80 having a first leg 82 extending axially upwardly along second face 78 of second segment 68 of mounting nut plate 63. L-shaped flange 80 has a second leg 84 extending radially inwardly from first leg 82 and beneath second segment 68 of mounting nut plate 63. Plenum 62 in the mounting head is radially inward of the threaded engagement at 70 of second segment 68 of mounting nut plate 63 and the mounting head.

Figure 6:
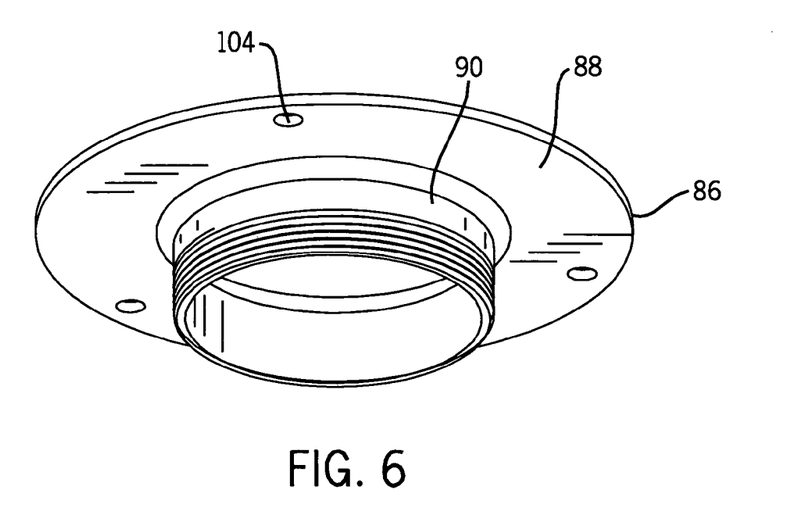
FIG. 6 is a perspective view of another component of FIG. 2.

Mounting head 36 includes an inverted L-shaped flange 86, FIGS. 2, 6, 7, having a first leg 88 extending radially outwardly and above first segment 64 of mounting nut plate 63 and open axial end 61 of canister 34 and sealed thereto by gasket 72 in axial compression. Inverted L-shaped flange 86 has a second leg 90 extending axially downwardly and having a first face 92 facing radially outwardly and threadingly engaging at 70 the first face 76 of second segment 68 of mounting nut plate 63. Second leg 90 of inverted L-shaped flange 86 has a second face 94 facing radially inwardly and defining plenum 62. Second leg 90 of inverted L-shaped flange 86 extends axially downwardly to a lower end 96 above second leg 84 of L-shaped flange 80 of electrical insulator 50. Apertures 58 extend axially through second leg 84 of L-shaped flange 80 radially inward of second leg 90 of inverted L-shaped flange 86. Recirculation gas flows from inlet 24 through a first annulus 60 between electrical conductor 42 and canister 34. Electrical insulator 50 is the noted disk having an outer portion with L-shaped flange 80 extending outwardly therefrom, and having a central portion with a columnar stalk 98 extending axially upwardly therefrom into plenum 62 and spaced radially inwardly of second leg 90 of inverted L-shaped flange 86 by a second annulus 100 therebetween defining plenum 62. Second annulus 100 has a smaller outer diameter than first annulus 60. The outer diameter of second annulus 100 is substantially equal to the inner diameter of first annulus 60.

The disclosed construction provides a removable and replaceable EDC assembly. The mounting plate provided by nut plate 63 engages the mounting head in threaded relation at a location 70 radially inward of gasket 72. First and second faces 76 and 78 of the mounting nut plate face radially in opposite directions, and mounting nut plate 63 at such faces is radially between the mounting head at 90 and the electrical insulator 50 at leg 82 on radially distally opposite sides thereof. The electrical insulator has a face 102 facing radially inwardly and engaging face 78 of the mounting nut plate. Face 102 of the electrical insulator is radially outward of face 92 of the mounting head.

Figure 9:
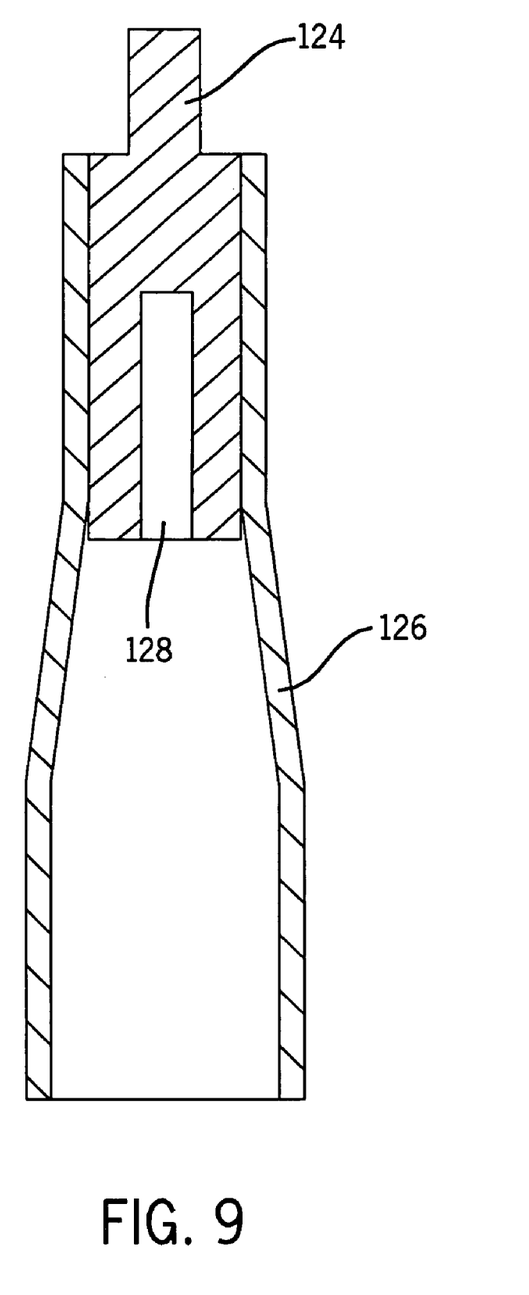
FIG. 9 is a sectional view of a portion of FIG. 8.

Inverted L-shaped flange 86 is mounted at bolt or rivet holes 104, FIG. 6, to an upper cap or housing 106 of the mounting head 36, FIGS. 1, 2, 6, 8. Cap 106 is mounted at bolt holes 108 to the engine or a designated location in the engine compartment. A first wall or divider 110 is mounted to the cap at bolt or screw holes 112 and defines the upper wall of plenum 62. A second wall or divider 114 is mounted to the cap at bolt or screw holes 116 and is spaced above wall 110 by different height stand-offs in the cap, for example longer stand-offs 118 for wall 110, and shorter stand-offs 120 for wall 114. Wall 114 is thus spaced above wall 110 by a space or gap therebetween. Wall 114 is provided by a circuit board having power supply circuitry thereon (not shown) electrically connected externally through plug fitting 122 for supplying electrical current to the power supply circuitry. The power supply circuitry supplies the noted high voltage to a female electrode terminal 124, FIG. 9, mounted to the circuit board and shrouded by electrically insulating boot 126 and having a socket receptacle 128 receiving upper male end 130 of electrode terminal 52 upon mounting of the canister and corona discharge assembly to mounting head 36. Columnar stalk 98 extends upwardly through opening 132 in wall 110. Walls 110 and 114 have respective cut-outs or openings 134 and 136 aligned with tubular opening 138 formed through cap 106 and exiting at outlet 28, to pass recirculation gas from plenum 62 through cut-outs 134, 136 then through tubular passage 138 to outlet 28 for return to the engine.

The invention provides a method for easily servicing an internal combustion engine crankcase ventilation system having an EDC, by removing the corona discharge electrode assembly 38 and the canister 34 as a unit from mounting head 36, for replacement by replacing a new corona discharge electrode assembly and canister and mounting same as a unit to mounting head 36. The mounting head, including cap 106 and flange 86 and the components therein, remain attached to the engine or a designated mounted location in the engine compartment. Canister 34 with corona discharge electrode assembly 38 therein is discarded. Canister 34, mounting nut plate 63, insulator 50 and conductor 42 are installed as a unit by detachable mounting of mounting nut plate 63 to the mounting head at threads 70. Canister 34, mounting nut plate 63, insulator 50 and conductor 42 are removed as a unit by detaching mounting nut plate 63 from the mounting head at threads 70. The canister is simply unscrewed from its threaded relation with the mounting head, comparably to removal of an oil filter. This familiarity is considered desirable to encourage maintenance at recommended intervals by service personnel, without having to learn unfamiliar service procedures.

In continuing development, it is anticipated that various alternatives will be considered, including integration of threads, flanges and the like into castings of the components such as the power supply housing or mounting head, various alternate electrical connections for the high voltage terminal such as a pin and socket type of connector providing positive connection and tolerating slight misalignment within set tolerances.

Figure 10:
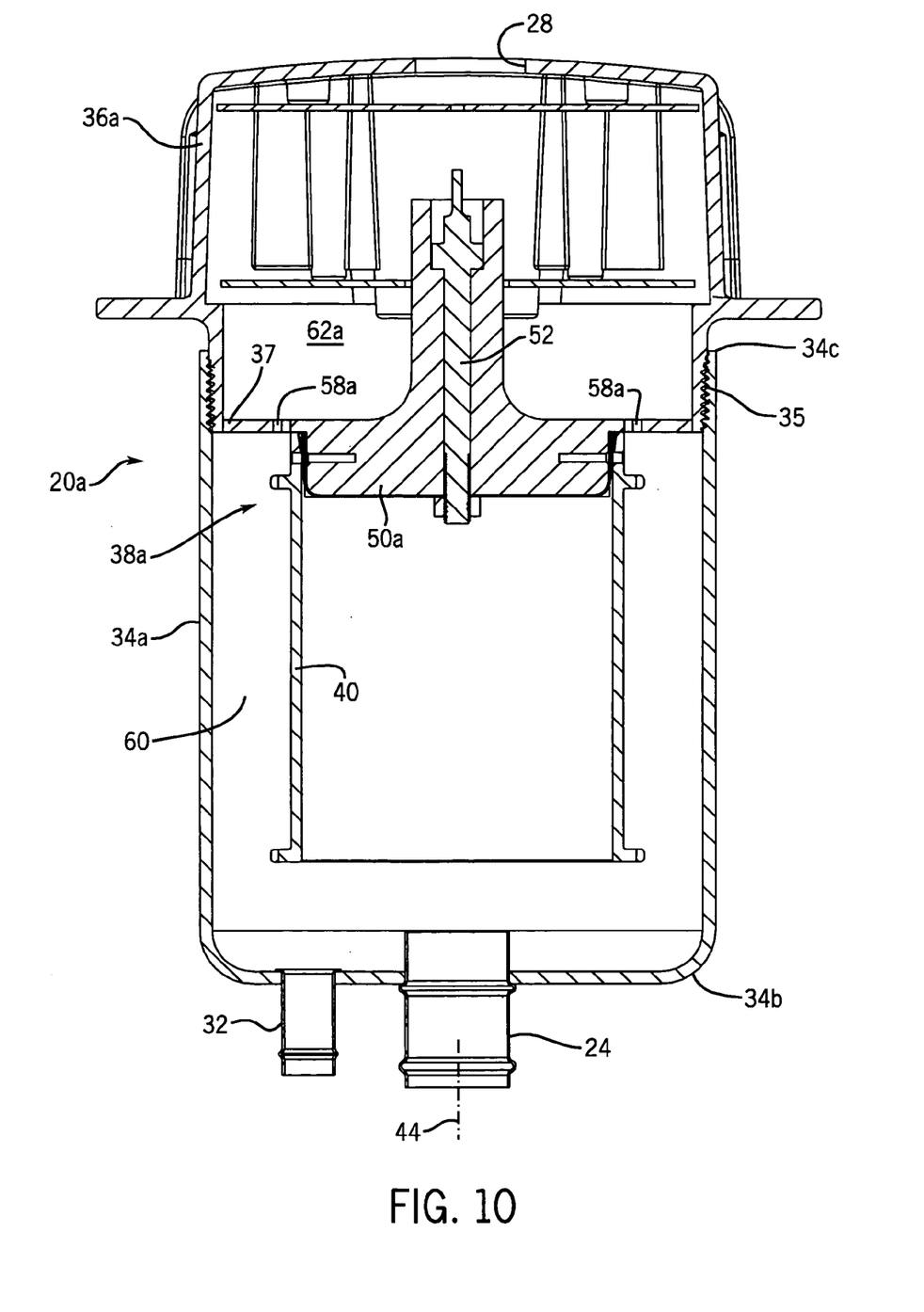
FIG. 10 is a sectional view similar to FIG. 2 and showing another embodiment.

FIG. 10 shows another embodiment and uses like reference numerals from above where appropriate to facilitate understanding. In this embodiment, only the collector electrode provided by the outer canister is removed from the mounting head, while the discharge electrode assembly remains mounted to the mounting head. EDC assembly 20a includes a canister 34a mounted to mounting head 36a.

Corona discharge electrode assembly 38a in canister 34a is spaced from the canister by gap 60 providing a corona discharge zone, with canister 34a providing the collector electrode. Canister 34a is removably mounted to mounting head 36a at threads 35 to permit removal of the collector electrode provided by canister 34a and replacement with a new collector electrode provided by a new canister. In FIG. 2, corona discharge electrode assembly 38 is mounted to canister 34, as above described, and removable therewith as a unit from the mounting head. In FIG. 10, corona discharge electrode assembly 38a is mounted to the mounting head, e.g. by welding or bonding or the like at interface 37, and remains mounted to the mounting head upon removal of canister 34a from mounting head 36a. Canister 34a engages mounting head 36a in threaded engagement at threads 35 such that the canister is mounted to the mounting head in spin-on relation, and is removed from the mounting head in spin-off relation. Canister 34a extends axially along axis 44 between first and second axial ends 34b and 34c. End 34b is close closed and has the noted inlet 24. End 34c is open and faces mounting head 36a and has the noted threads 35 threaded to the mounting head in threaded engagement. The upper portion of mounting head 36a is like mounting head 36 and has the noted outlet 28. Corona discharge electrode assembly 38a is like corona discharge electrode assembly 38 along bobbin 40 and has the noted electrical conductor 42 attached to the electrical insulator provided by bobbin 40 and electrically insulating disk 50a having one or more apertures 58a passing gas axially therethrough from canister 34a to mounting head 36a. Apertures 58a are radially inward of threads 35 and are axially aligned with gap 60 providing the corona discharge zone. Gas flows through apertures 58a into plenum 62a in the mounting head, which plenum is radially inward of threads 35. Gas flows from inlet 24 through a first annulus at 60 and flows through a second annulus in plenum 62a. The first annulus has a larger inner diameter than the second annulus.

It is recognized that various equivalents, alternatives and modifications are possible within the scope of the appended claims.

What is claimed is:

1. In an internal combustion engine electrostatic crankcase ventilation system, an EDC, electrostatic droplet collector, assembly having an inlet receiving gas from said engine, and an outlet discharging cleaned gas, comprising a canister mounted to a mounting head in said system, a corona discharge electrode assembly in said canister and spaced from said canister by a gap providing a corona discharge zone, said canister providing a collector electrode, said canister being removably mounted to said mounting head to permit removal and replacement of said collector electrode, wherein said corona discharge electrode assembly is mounted to said mounting head and remains mounted to said mounting head upon removal of said canister from said mounting head.

2. The EDC assembly according to claim 1 wherein said canister engages said mounting head in threaded engagement such that said canister is mounted to said mounting head in spin-on relation, and is removed from said mounting head in spin-off relation.

3. The EDC assembly according to claim 2 wherein said canister extends axially along an axis between first and second axial ends, said first end being closed and having said inlet, said second end being open and facing said mounting head and having threads threaded to said mounting head in said threaded engagement.

4. The EDC assembly according to claim 3 wherein said corona discharge electrode assembly comprises an electrical conductor attached to an electrical insulator having one or more apertures passing said gas axially therethrough from said canister to said mounting head.

5. In an internal combustion engine electrostatic crankcase ventilation system, an EDC, electrostatic droplet collector, assembly having an inlet receiving gas from said engine, and an outlet discharging cleaned gas, comprising a canister mounted to a mounting head in said system, a corona discharge electrode assembly in said canister and spaced from said canister by a gap providing a corona discharge zone, said canister providing a collector electrode, said canister being removably mounted to said mounting head to permit removal and replacement of said collector electrode, wherein said canister engages said mounting head in threaded engagement such that said canister is mounted to said mounting head in spin-on relation, and is removed from said mounting head in spin-off relation, said canister extends axially along an axis between first and second axial ends, said first end being closed and having said inlet, said second end being open and facing said mounting head and having threads threaded to said mounting head in said threaded engagement, wherein said corona discharge electrode assembly comprises an electrical conductor attached to an electrical insulator having one or more apertures passing said gas axially therethrough from said canister to said mounting head, and wherein said one or more apertures are radially inward of said threads.

6. The EDC assembly according to claim 5 wherein said one or more apertures are axially aligned with said gap providing said corona discharge zone.

7. The EDC assembly according to claims 5 wherein said gas flows through said one or more apertures into a plenum in said mounting head, said plenum being radially inward of said threads.

8. In an internal combustion engine electrostatic crankcase ventilation system, an EDC, electrostatic droplet collector, assembly having an inlet receiving gas from said engine, and an outlet discharging cleaned gas, comprising a canister mounted to a mounting head in said system, a corona discharge electrode assembly in said canister and spaced from said canister by a gap providing a corona discharge zone, said canister providing a collector electrode, said canister being removably mounted to said mounting head to permit removal and replacement of said collector electrode, wherein said canister engages said mounting head in threaded engagement such that said canister is mounted to said mounting head in spin-on relation, and is removed from said mounting head in spin-off relation, wherein said canister extends axially along an axis between first and second axial ends, said first end being closed and having said inlet, said second end being open and facing said mounting head and having threads threaded to said mounting head in said threaded engagement, wherein said corona discharge electrode assembly comprises an electrical conductor attached to an electrical insulator having one or more apertures passing said gas axially therethrough from said canister to said mounting head, wherein said gas flows through said one or more apertures into a plenum in said mounting head, said plenum being radially inward of said threads, and wherein said gas flows from said inlet through a first annulus between said electrical conductor and said canister, and flows through a second annulus in said plenum, said first annulus having a larger inner diameter than said second annulus.

9. The EDC assembly according to claim 5 wherein said inlet is in said canister, said outlet is in said mounting head, and wherein said gas flows from said canister into a plenum in said mounting head then to said outlet, said mounting head having a wall defining said plenum on one side thereof and defining a space on the other side thereof having a high voltage electrode.

10. The EDC assembly according to claim 9 wherein said mounting head has a passage therein extending through said space on said other side of said wall and passing gas therethrough from said plenum to said outlet.

11. In an internal combustion engine electrostatic crankcase ventilation system, an EDC, electrostatic droplet collector, assembly having an inlet receiving gas from said engine, and an outlet discharging cleaned gas, comprising a canister mounted to a mounting head in said system, a corona discharge electrode assembly in said canister and spaced from said canister by a gap providing a corona discharge zone, said canister providing a collector electrode, said canister being removably mounted to said mounting head to permit removal and replacement of said collector electrode, wherein said inlet is in said canister, said outlet is in said mounting head, and wherein said gas flows from said canister into a plenum in said mounting head then to said outlet, said mounting head having a wall defining said plenum on one side thereof and defining a space on the other side thereof having a high voltage electrode, wherein said mounting head has a passage therein extending through said space on said other side of said wall and passing gas therethrough from said plenum to said outlet, and comprising a second wall in said mounting head facing said first mentioned wall and separated therefrom by a gap defining said space on said other side of said first wall.

12. The EDC assembly according to claim 11 wherein said high voltage electrode is in said gap between said first and second walls, and said passage spans said gap between said first and second walls.

13. A method for servicing an internal combustion engine crankcase ventilation system having an EDC, electrostatic droplet collector, comprising providing a canister removably mounted to a mounting head in said system, providing a corona discharge electrode assembly in said canister and spaced from said canister by a gap providing a corona discharge zone, said canister providing a collector electrode, removing said canister from said mounting head for removal and replacement of said collector electrode, wherein said corona discharge electrode assembly is mounted to said mounting head and remains mounted to said mounting head upon removal of said canister from said mounting head.

14. In an internal combustion engine electrostatic crankcase ventilation system, an EDC, electrostatic droplet collector, assembly comprising a canister removably mountable to a mounting head in said system, said canister having an inlet for receiving gas from said engine, said mounting head having an outlet for discharging cleaned gas, a corona discharge electrode assembly in said canister and removable therewith as a unit from said mounting head, wherein said canister extends axially along an axis and has an open axial end facing said mounting head, and comprising a mounting plate having a first portion attached to said canister and a second portion removably mountable to said mounting head, and an electrical insulator attached to said mounting plate, and wherein said corona discharge electrode assembly comprises an electrical conductor attached to said electrical insulator, wherein said mounting plate comprises a nut plate having a first segment attached to said canister, said first segment also being sealed to said mounting head by an annular casket therebetween, said nut plate having a second segment engaging said mounting head in threaded relation, and wherein said nut plate has an intermediate shoulder segment extending radially inwardly from said first segment to said second segment, said first segment extends axially upwardly from said shoulder segment and supports said gasket, said second segment extends axially downwardly from said shoulder segment, said second segment having a first face facing radially inwardly and being threaded, and a second face facing radially outwardly, said electrical insulator having an outer L-shaped flange having a first leg extending axially upwardly along said second face of said second segment of said nut plate, and having a second leg extending radially inwardly from said first leg and beneath said second segment of said nut plate.

15. The EDC assembly according to claim 14 wherein said electrical insulator has one or more apertures therethrough, and said gas flows through said one or more apertures into a plenum in said plenum being radially inward of the threaded engagement of said second segment of said nut plate and said mounting head.

16. The EDC assembly according to claim 15 wherein said mounting head includes an inverted L-shaped flange having a first leg extending radially outwardly and above said first segment of said nut plate and said open axial end of said canister and sealed thereto by said gasket in axial compression, said inverted L-shaped flange having a second leg extending axially downwardly and having a first face facing radially outwardly and threadingly engaging said first face of said second segment of said nut plate, said second leg of said inverted L-shaped flange having a second face facing radially inwardly and defining said plenum.

17. The EDC assembly according to claim 16 wherein said second leg of said inverted L-shaped flange extends axially downwardly to a lower end, said lower end being above said second leg of said L-shaped flange of said electrical insulator, said apertures extending axially through said second leg of said L-shaped flange of said electrical insulator radially inward of said second leg of said inverted L-shaped flange.

18. The EDC assembly according to claim 17 wherein gas flows from said inlet through a first annulus between said electrical conductor an said canister, said insulator comprises a disc having an outer portion with said L-shaped flange extending outwardly therefrom, and having a central portion with a columnar stalk extending axially upwardly therefrom into said plenum and spaced radially inwardly of said second leg of said inverted L-shaped flange by a second annulus therebetween defining said plenum, said second annulus having a smaller outer diameter than said first annulus.

19. The EDC assembly according to claim 18 wherein the outer diameter of said second annulus is substantially equal to the inner diameter of said first annulus.

20. A removable and replaceable EDC, electrostatic droplet collector, assembly for an internal combustion engine electrostatic crankcase ventilation system, said assembly comprising an axially extending canister having an open axial end, a mounting plate fixed to said canister and detachably mountable to a mounting head in said system, a gasket sealingly compressed between said mounting plate and said mounting head, an electrical insulator attached to said mounting plate, and a corona discharge electrode attached to said electrical insulator, wherein said mounting plate has a first face engaging said mounting head in detachable relation, and a second distally opposite face engaging said electrical insulator in fixed relation.

21. The EDC assembly according to claim 20 wherein said first and second faces face radially in opposite directions, and wherein said mounting plate at said first and second faces is radially between said mounting head and said electrical insulator on radially distally opposite sides thereof.

22. The EDC assembly according to claim 21 wherein said mounting head has a face facing radially outwardly and engaging said first face of said mounting plate, said electrical insulator has a face facing radially inwardly and engaging said second face of said mounting plate, and wherein said face of said electrical insulator is radially outward of said face of said mounting head.

23. In an internal combustion engine electrostatic crankcase ventilation system, an EDC, electrostatic droplet collector, assembly comprising a canister removably mountable to a mounting head in said system, said canister having an inlet for receiving gas from said engine, said mounting head having an outlet for discharging cleaned gas, a corona discharge electrode assembly in said canister and removable therewith as a unit from said mounting head, said corona discharge electrode assembly comprising an electrical insulator supporting an electrical conductor, wherein gas flows from said inlet through a first annulus between said electrical conductor and said canister, said insulator comprises a disk having a central portion with a columnar stalk extending axially upwardly therefrom into a plenum in said mounting head and defining a second annulus therebetween through which recirculation gas flows to said outlet, said second annulus having a smaller outer diameter than said first annulus.

24. The EDC assembly according to claim 23 wherein the outer diameter of said second annulus is substantially equal to the inner diameter of said first annulus.

25. In an internal combustion engine electrostatic crankcase ventilation system, an EDC, electrostatic droplet collector, assembly comprising a canister removably mountable to a mounting head in said system, said canister having an inlet for receiving gas from said engine, said mounting head having an outlet for discharging cleaned gas, a corona discharge electrode assembly in said canister and removable therewith as unit from said mounting head, wherein gas flows from said canister into a plenum in said mounting head then to said outlet, said mounting head having a wall defining said plenum on one side thereof and defining a space on the other side thereof having a high voltage electrode, wherein said mounting head has a passage therein extending through said space on said other side of said wall and passing gas therethrough from said plenum to said outlet, and comprising a second wall in said mounting head facing said first mentioned wall and separated therefrom by a gap defining said space on said other side of said first wall, wherein said high voltage electrode is in said gap between said first and second walls, and said passage spans said gap between said first and second walls.

26. The EDC assembly according to claim 25 wherein said corona discharge electrode assembly comprises an electrical insulator having one or more apertures therethrough passing gas from said canister into said plenum.

27. In an internal combustion engine electrostatic crankcase ventilation system, an EDC, electrostatic droplet collector, assembly comprising a canister removably mountable to a mounting head in said system, said canister having an inlet for receiving gas from said engine, said mounting head having an outlet for discharging cleaned gas, a corona discharge electrode assembly in said canister and removable therewith as unit from said mounting head, wherein gas flows from said canister into a plenum in said mounting head then to said outlet, said mounting head having a wall defining said plenum on one side thereof and defining a space on the other side thereof having a high voltage electrode, wherein said corona discharge electrode assembly comprises an electrical insulator having one or more apertures therethrough passing gas from said canister into said plenum, and wherein said insulator comprises a stalk extending through said plenum, and wherein said wall has an opening receiving said stalk extending therethrough.

28. The EDC assembly according to claim 27 wherein said wall has a second opening therethrough passing gas from said plenum to said outlet.

* * * * *